United States Patent
Joo

(10) Patent No.: US 6,864,735 B2
(45) Date of Patent: Mar. 8, 2005

(54) CIRCUIT AND METHOD FOR REGENERATING RESET AND CLOCK SIGNALS AND HIGH-SPEED DIGITAL SYSTEM INCORPORATING THE SAME

(75) Inventor: Jin-tae Joo, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/665,175

(22) Filed: Sep. 18, 2003

(65) Prior Publication Data

US 2004/0113675 A1 Jun. 17, 2004

(30) Foreign Application Priority Data

Dec. 16, 2002 (KR) .................................. 10-2002-0080115

(51) Int. Cl.[7] .............................................. G06F 1/04
(52) U.S. Cl. ...................................... 327/298; 327/165
(58) Field of Search ................................ 327/165–166, 327/170, 172–176, 178, 291–298

(56) References Cited

U.S. PATENT DOCUMENTS

| | | | | |
|---|---|---|---|---|
| 4,979,194 A | * | 12/1990 | Kawano | .................. 377/55 |
| 5,768,281 A | * | 6/1998 | Takano | ................. 370/503 |
| 5,821,781 A | * | 10/1998 | Rigazio | ................... 327/99 |
| 6,016,071 A | * | 1/2000 | Shay | ...................... 327/294 |
| 6,756,827 B2 | * | 6/2004 | Konuk et al. | ........... 327/116 |

* cited by examiner

Primary Examiner—My-Trang Nu Ton
(74) Attorney, Agent, or Firm—Mills & Onello, LLP

(57) ABSTRACT

An apparatus and method for regenerating reset and clock signals and a high-speed digital system using the apparatus and method are provided. In the regenerating circuit of the invention, a clock circuit receives an external clock signal and generates there from an internal clock signal, which is forwarded to a plurality of clocked circuits such as, for example, D flip-flops. A reset circuit receives an external reset signal and generates therefrom an internal reset signal, which is forwarded to the clocked circuits to reset the clock circuits. A clock masking circuit masks the internal clock signal for a masking period such that the clocked circuits are not clocked during the masking period. The high-speed digital system of the invention includes a plurality of function blocks coupled on a bus. The reset and clock regenerating circuit of the invention generates internal reset and clock signals from externally applied reset and clock signals.

45 Claims, 11 Drawing Sheets

(n : even)

B = (A+C)/2

CIRCUIT AND METHOD FOR REGENERATING RESET AND CLOCK SIGNALS AND HIGH-SPEED DIGITAL SYSTEM INCORPORATING THE SAME

RELATED APPLICATIONS

This application claims the priority of Korean Patent Application No. 2002-0080115, filed Dec. 16, 2002, in the Korean Intellectual Property Office, the contents of which are incorporated herein in their entirety by reference.

1. Field of the Invention

The present invention relates to a semiconductor device with external reset and clock signals and a high-speed digital system incorporating the same.

2. Background of the Invention

Flip-flop circuits are essential elements that are used in almost all integrated circuits. Among other functions, flip-flop circuits are used to store data as results of computations carried out by digital circuits, or they sequentially arrange data in an integrated circuit to utilize computations. Binary flip-flops are capable of storing two signal levels, that is, logic high and logic low. In general, all signals to flip-flops have the two possible logic levels. One example of such a flip-flop is illustrated in FIG. 1A, which is a block diagram of a conventional flip-flop circuit.

Referring to FIG. 1A, a conventional flop-flop circuit (FF) 10 has four terminals, a data input terminal D, a clock input terminal CK, a data output terminal Q, and a reset terminal RN. As well known in the art, the flip-flop circuit 10 latches an input signal applied to the data input terminal D when an input signal to the clock terminal (hereinafter, referred to as a clock signal) transitions from a low level to a high level. The flip-flop circuit 10 retains the latched signal when the clock signal transitions from the high level to the low level. When an input signal to the reset terminal RN is activated, an output Q of the flip-flop circuit 10 is initialized or reset to a low level. In the flip-flop circuit of FIG. 1, the reset signal is active in a logic low state.

In general, a flop-flop circuit has to be designed to satisfy the following timing conditions. Under a first timing condition, a clock signal to a clock terminal CK has to be triggered after a reset signal to the reset terminal RN is inactivated and a recovery time $t_{RC}$ elapses. Here, triggering of the clock signal means a low-to-high transition of the clock signal. Under a second timing condition, the reset signal is inactivated after the clock signal is triggered and a removal time $t_{RM}$ elapses.

Before a reset signal to a reset terminal RN is inactivated and the recovery time $t_{RC}$ elapses, as illustrated in FIG. 1B, a clock signal to the clock terminal CK can be triggered. In this case, it is difficult to ensure that a flip-flop circuit will latch a value applied to the data input terminal D thereof. Likewise, after the clock signal is triggered, as illustrated in FIG. 1C, the reset signal can be inactivated within a shorter time than the removal time $t_{RM}$. Under this condition, it is also difficult to ensure the flip-flop circuit will latch a value applied to the data input terminal D thereof. Accordingly, the flip-flop circuits should be designed so that the inactivated point of time of a reset signal does not coincide with a rising edge (or, a positive edge) of a clock signal.

One method for overcoming the above timing limitations is to design flip-flop circuits so that a reset signal is inactivated at a falling edge (or a negative edge) of the clock signal. A conventional semiconductor device designed according to this manner is illustrated in FIG. 2A.

Referring to FIG. 2A, a semiconductor device 20 includes a plurality of flip-flop circuits, FF1, FF2. Although not shown in the figure, several thousands or tens of thousands of flip-flop circuits are typically used in a semiconductor device. Each of the flip-flop circuits FF1 and FF2 has four terminals, a data input terminal D, a clock input terminal CK, a data output terminal Q, and a reset terminal RN. A reset signal RESET is applied to a reset terminal RN of the flip-flop circuit FF1 through a buffer B1, a clock signal CLOCK is applied to a clock terminal CK thereof through a buffer B2, and data DA signal is applied to a data input terminal D thereof. The reset signal RESET is applied to a reset terminal RN of the flip-flop circuit FF2 through buffers B1, B3 and B4, the clock signal CLOCK is applied to a clock terminal CK thereof through a buffer B2, and the data signal DA is applied to a data input terminal D thereof.

In accordance with the above design, as illustrated in FIG. 2B, a reset signal RESET is inactivated at a falling edge of the clock signal CK. In the case of the flip-flop circuit FF1, an inactivated point of time of a reset signal RESET1 does not coincide with a rising edge of a clock signal CLOCK1. This ensures that the flip-flop circuit FF1 will latch data. In the case of the flip-flop circuit FF2, an inactivated point of time of a reset signal RESET2 coincides with a rising edge of a clock signal CLOCK2 as illustrated by a dotted line in FIG. 2B. As a result, it is difficult to ensure that the flip-flop circuit FF2 will latch data. This is because several thousands or tens of thousands of flip-flop circuits are scattered or distributed in a semiconductor device. That is, since a delay time of a signal line for transmitting a clock signal is different from that of a signal line for transmitting a reset signal, there can exist one or more flip-flop circuits in which an inactivated point of time of a reset signal coincides with a rising edge of a clock signal.

The above problem can be solved by designing a signal path so that the maximum delay time of clock and reset signals are shorter than a half period of the system clock signal. However, as a system clock signal becomes faster, this method burdens circuit designs. For example, other timing problems can occur by rerouting other important signal paths to shorten the delay time of a reset signal path.

SUMMARY OF THE INVENTION

In one aspect, the invention is directed to an apparatus and method for regenerating reset and clock signals. A clock circuit receives an external clock signal and generates therefrom an internal clock signal. The internal clock signal is forwarded to a plurality of clock circuits to clock the clocked circuits. A reset circuit receives an external reset signal and generates therefrom an internal reset signal. The internal reset signal is forwarded to the plurality of clocked circuits to reset the clocked circuits. A clock masking circuit masks the internal clock signal for a masking period such that the clocked circuits are not clocked during the masking period.

The reset circuit can generate the internal reset signal in a transition to an inactive state during the masking period. In one embodiment, the internal reset signal transitions to an inactive state at a substantial midpoint of the masking period.

The system of the invention can further include a counter circuit for generating a count of a number of cycles of the external clock signal. Also, a first comparator circuit can compare the count with a first threshold and initiate the masking period when the count reaches the first threshold. A second comparator circuit can compare the count with a second threshold and terminate the masking period when the count reaches the second threshold. A third comparator circuit can compare the count with a third threshold and transition the internal reset signal to an inactive state when the count reaches the third threshold. The third threshold can be between the first and second thresholds and, specifically, can be substantially midway between the first and second thresholds. The first, second and third thresholds can be selected such that, in all of the clocked circuits, ambiguity with respect to timing of clocking and resetting the clocked circuits is eliminated.

The circuit of the invention can also include a mask delay circuit for delaying the masking period until after a predicted external clock signal routing delay. The masking circuit can generate a mask signal used in initiating and terminating the masking period.

The clocked circuits can be flip-flops and, in particular, they can be D flip-flops.

In another aspect, the invention is directed to a high-speed digital system. The system includes a plurality of function blocks and a bus to which the function blocks are coupled. In addition, the system includes the circuit or apparatus for regenerating reset signals and clock signals in accordance with the invention.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1A:
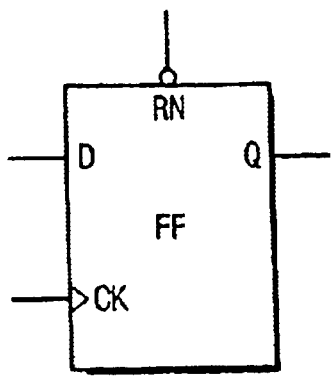
FIG. 1A is a logic diagram showing a conventional flip-flop circuit.
Figure 1B:
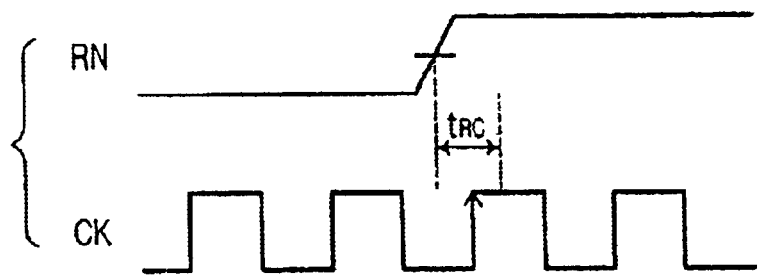
FIG. 1B is a timing diagram showing recovery time between a reset signal and a clock signal used for the flip-flop circuit illustrated in FIG. 1A.
Figure 1C:
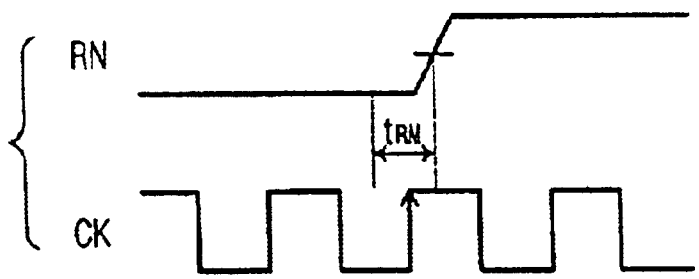
FIG. 1C is a timing diagram showing removal time between a reset signal and a clock signal used for the flip-flop circuit illustrated in FIG. 1A.
Figure 2A:
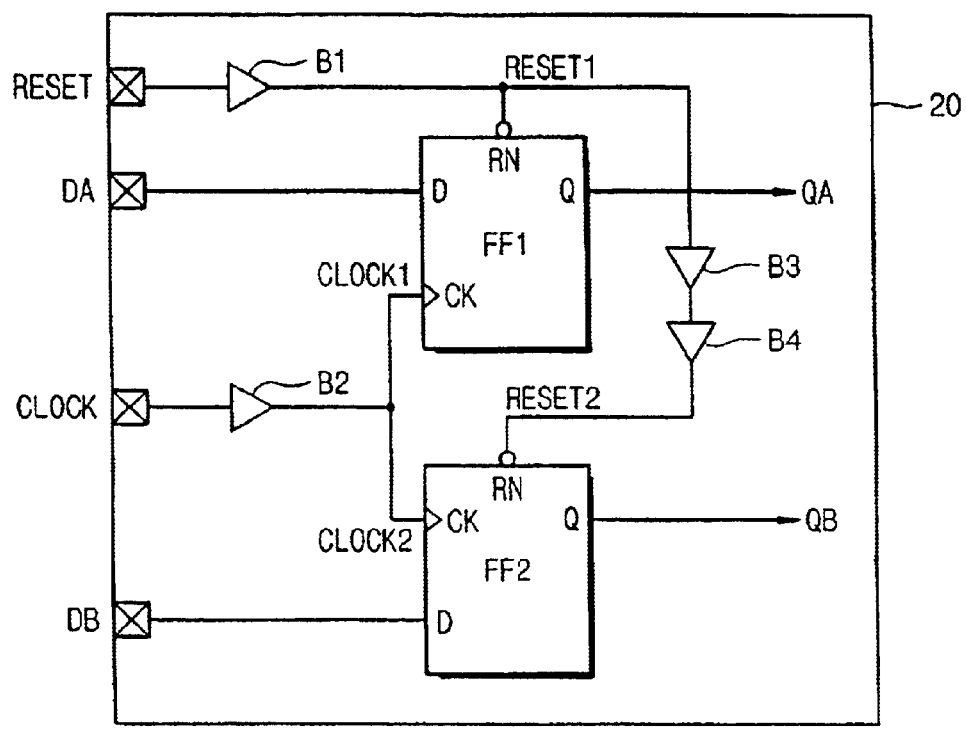
FIG. 2A is a schematic block diagram showing a conventional semiconductor device.
Figure 2B:
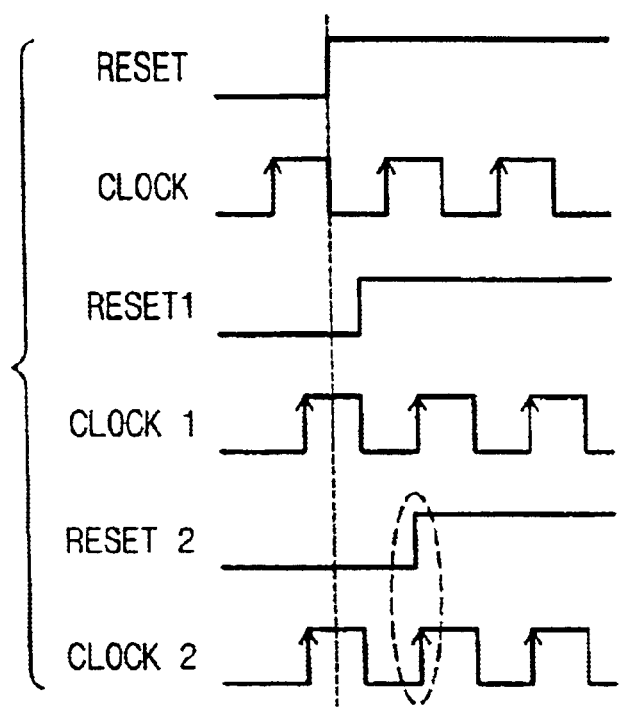
FIG. 2B is a timing diagram showing a delay relationship between signals used in FIG. 2A.
Figure 3:
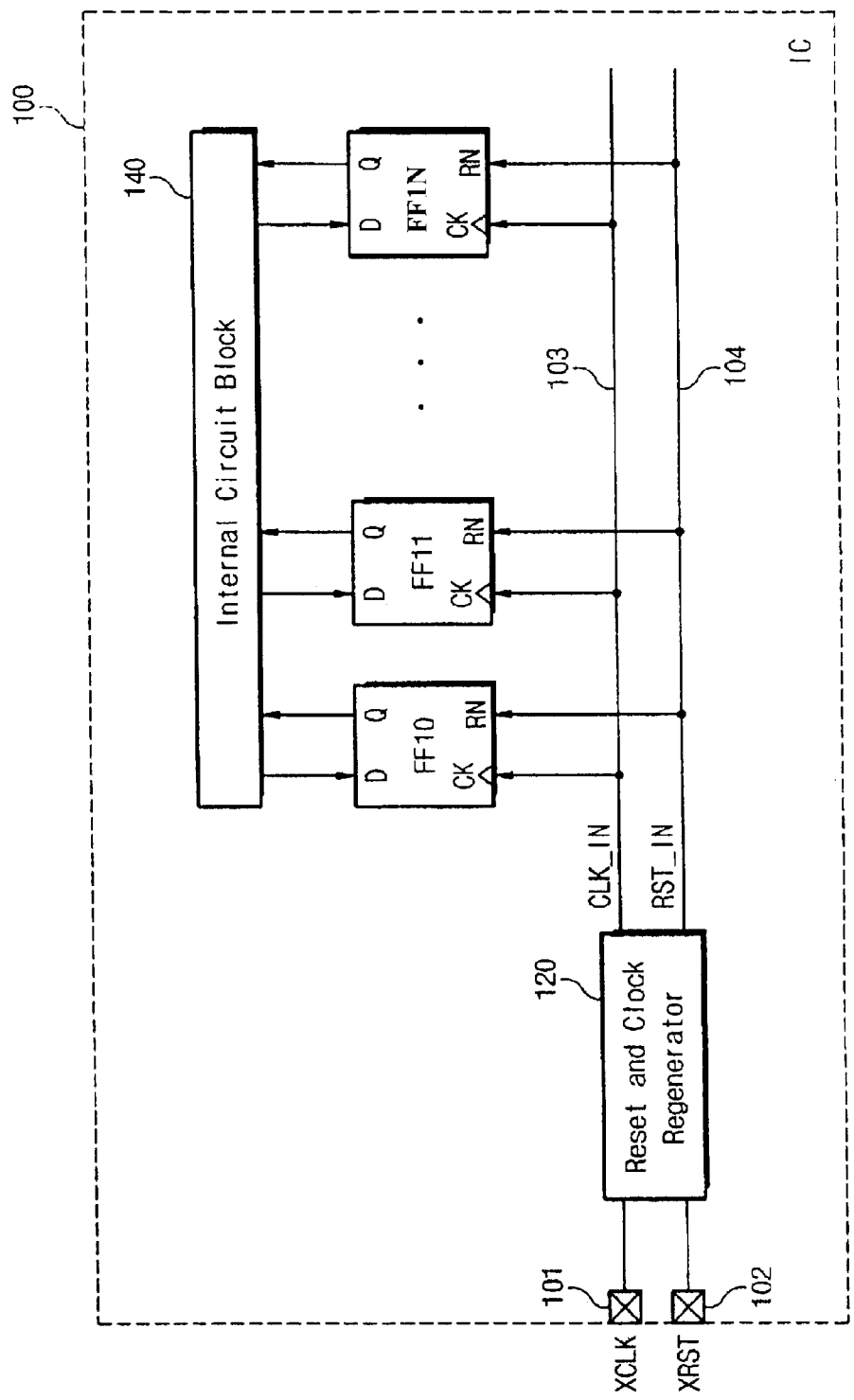
FIG. 3 is a block diagram showing a semiconductor device according to the present invention.

A block diagram of a semiconductor device according to the present invention is illustrated in FIG. 3. Referring to FIG. 3, a semiconductor device 100 of the present invention is supplied with an external clock signal, e.g., a system clock signal, XCLK and an external reset signal XRST. The external reset signal XRST is used to initialize memory elements, e.g., flip-flops, in the semiconductor device 100. The semiconductor device 100 comprises a reset and clock regenerator circuit 120 connected to input terminals 101 and 102. The external clock signal XCLK is applied to input terminal 101, and the external reset signal XRST is applied to the input terminal 102. The reset and clock regenerator circuit 120 generates an internal clock signal CLK_IN and an internal reset signal RST_IN in response to the external clock signal XCLK and the external reset signal XRST. The clock signals XCLK and CLK_IN have the same period.

The internal clock signal CLK_IN and the internal reset signal RST_IN from the regenerator circuit 120 are transferred to signal lines 103 and 104, respectively, to which a plurality of flip-flops FF10, FF11, . . . , FF1N are connected. Each of the flip-flops FF10–FF1N has four terminals, a data input terminal D for receiving data from an internal circuit block 140, a clock terminal CK connected to the CLK_IN signal line 103, a reset terminal RN connected to the RST_IN signal line 104, and a data output terminal Q for outputting latched data to the internal circuit block 140. An example where the flip-flops FF10–FF1N communicate only with the internal circuit block 140 is illustrated in FIG. 3, but it will be understood that a portion of the flip-flops communicate with external circuitry via data input/output terminals (not shown).

The reset and clock regenerator circuit 120 according to the present invention stops generating the internal clock signal CLK_IN after the external reset signal XRST is inactivated and after a predetermined amount of time elapses. At the same time, the regenerator circuit 120 enables the internal reset signal RST_IN to be inactivated within a period where the internal clock signal CLK_IN is not generated. This means that the inactivated point of time of the internal reset signal RST_IN will not coincide with an active edge, i.e., a rising edge or a positive-edge, of the internal clock signal CLK_IN. Accordingly, the flip-flops FF10–FF1N supplied with the internal clock and reset signals CLK_IN and RST_IN from the regenerator circuit 120 will latch data without any problem.

Here, the period when the internal clock signal CLK_IN is not generated can be adjusted. By adjusting this period based on the maximum delay time of the signals CLK_IN and RST_IN and a clock frequency, the timing limitation between the signals CLK_IN and RST_IN can be solved irrespective of the period (frequency or speed) of the external clock signal XCLK.

Figure 4:
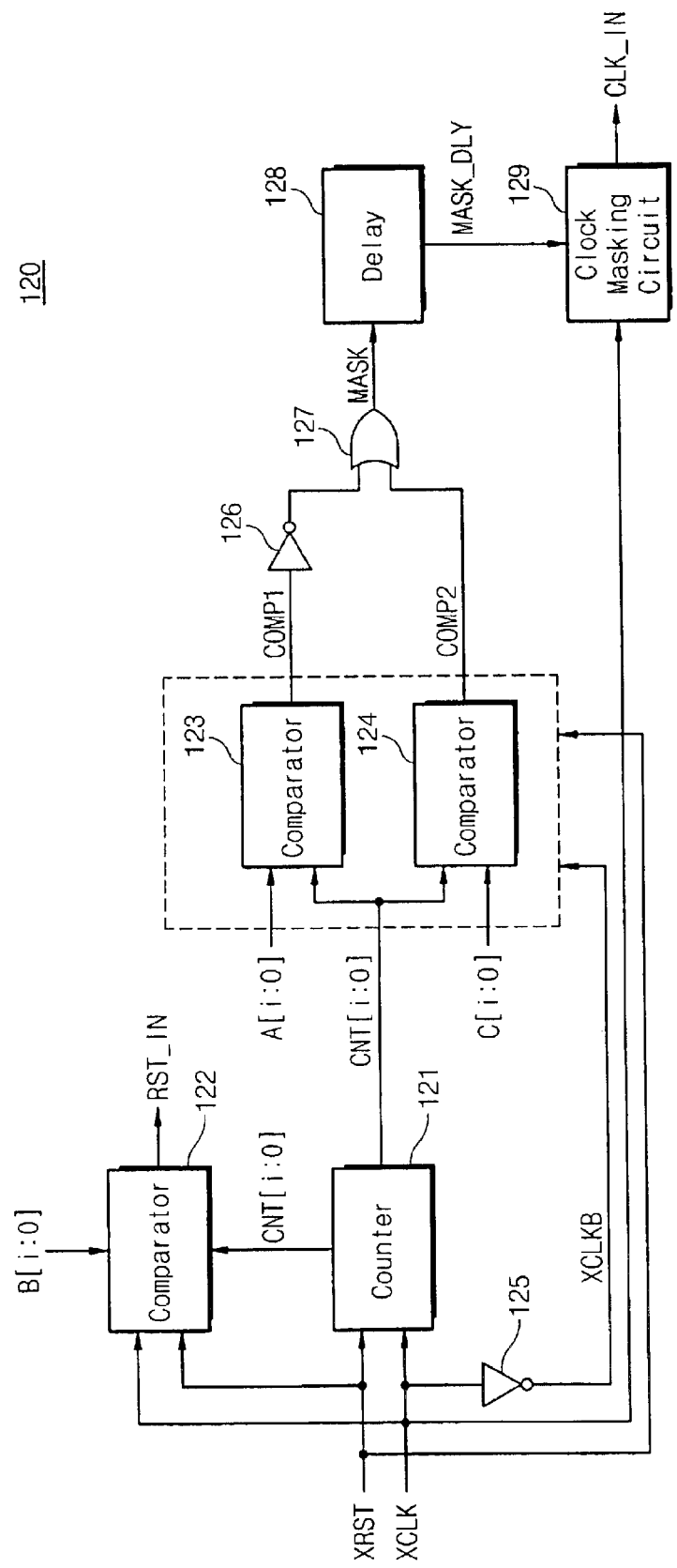
FIG. 4 is a block diagram showing a reset and clock regenerator circuit in FIG. 3 in accordance with a preferred embodiment of the present invention.

FIG. 4 shows a block diagram of a reset and clock regenerator circuit 120 according to a preferred embodiment of the present invention. Referring to FIG. 4, the reset and clock regenerator circuit 120 comprises a counter 121, comparators 122, 123 and 124, inverters 125 and 126, an OR gate 127, a delay circuit 128, and a clock masking circuit 129.

The counter 121 operates in response to the external clock signal XCLK and the external reset signal XRST. For example, when the external reset signal XRST is inactivated, the counter 121 performs a counting operation in response to the external clock signal XCLK. An output value CNT[i:0] of the counter 121 is supplied to the comparators 122, 123 and 124. In this embodiment, the counter 121 is formed of a 4-bit counter, but the counter 121 is not limited to the 4-bit counter.

The comparator 122 is supplied with the external clock signal XCLK, the external reset signal XRST, a reference value B[i:0], and the output value CNT[i:0] of the counter 121. An output signal, i.e., an internal reset signal RST_IN, of the comparator 122 is initialized at a low level when the external clock signal XRST is activated. That is, the internal reset signal RST_IN from the comparator 122 is activated in synchronization with an activation of the external reset signal XRST. The comparator 122 determines whether the output value CNT[i:0] of the counter 121 is the same as the reference value B[i:0]. When the output value CNT[i:0] of the counter 121 si the same as the reference value B[i:0], the internal reset signal RST_IN is inactivated. The internal reset signal RST_IN is activated in synchronization with an activation of the external reset signal XRST. Afterward, although the external reset signal XRST is inactivated, the internal reset signal RST_IN is not inactivated. The internal reset signal RST_IN is inactivated after the external reset signal XRST is inactivated and after a period of time elapses.

Here, the period of time is defined as a period where the counter 121 carries out a counting operation from "0" to "B[i:0]" in synchronization with the external clock signal XCLK.

Continuing to refer to FIG. 4, the comparators 123 and 124 operate in synchronization with an inverted clock signal XCLKB from the inverter 125, and are initialized by an inactivation of the external reset signal XRST. When initialized, outputs COMP1 and COMP2 of the comparators 123 and 124, respectively, have a logic low level.

The comparator 123 determines whether the output value CNT[i:0] of the counter 121 reaches a reference value A[i:0]. When the output value CNT[i:0] is lower than the reference value A[i:0], the output COMP1 of the comparator 123 retains an initial state, i.e., a logic low level. When the output value CNT[i:0] reaches the reference value A[i:0], the output COMP1 of the comparator 123 transitions from a logic low level to a logic high level.

The comparator 124 determines whether the output value CNT[i:0] of the counter 121 reaches a reference value C[i:0]. When the output value CNT[i:0] is lower than the reference value C[i:0], the output COMP2 of the comparator 124 retains an initial state (i.e., a logic low level). When the output value CNT[i:0] reaches the reference value C[i:0], the output COMP2 of the comparator 124 transitions from a logic low level to a logic high level.

The output COMP1 of the comparator 123 is applied to a first input terminal of the OR gate 127 via the inverter 126, and the output COMP2 of the comparator 124 is applied to a second input terminal of the OR gate 127. The OR gate 127 outputs a clock masking signal MASK in response to input signals. The clock masking signal MASK has a logic high level when the output value CNT[i:0] is lower than the reference value A[i:0]. The clock masking signal MASK is activated or transitions from a logic high level to logic low level when the output value CNT[i:0] is higher than the reference value A[i:0] and lower than the reference value C[i:0]. The clock masking signal MASK is inactivated or transitions from a logic low level to a logic high level when the output value CNT[i:0] is higher than the reference value C[i:0]. The table below shows the logic states of the clock masking signal MASK according to the values A[i:0], CNT [i:0] and C[i:0].

|  | COMP1 | COMP2 | MASK |
| --- | --- | --- | --- |
| A > CNT | L | L | H |
| A < CNT < C | H | L | L |
| C > CNT | H | H | H |

In this embodiment, a reference value B[i:0] of a comparator 122 is higher than a reference value A[i:0] of a comparator 123 and lower than a reference value C[i:0] of a comparator 124. For example, the reference value B[i:0] is set to have a value of (A[i:0]+C[i:0])/2. The reference values A[i:0], B[i:0] and C[i:0] can be provided externally. The reference values A[i:0], B[i:0] and C[i:0] can be previously stored in a register within the semiconductor device 100. This means that the reference values A[i:0], B[i:0] and C[i:0] are variable. This will be described hereinafter.

Referring to FIG. 4, the delay circuit 128 delays the clock masking signal MASK. In this embodiment, preferably, the clock masking signal MASK is delayed by a quarter of a period of the external clock signal XCLK. A delay time of the delay circuit 128 is determined within a half period of the external clock signal XCLK to prevent an inadvertent pulse or "glitch" of an internal clock signal CLK_IN from the clock masking circuit 129. This will be described hereinafter.

The clock masking circuit 129 generates the internal clock signal CLK_IN in response to the external clock signal XCLK during a high-level period of the clock masking signal MASK, that is, during a period where a delayed clock masking signal MASK_DLY from the delay circuit 128 is inactivated. The clock masking circuit 129 stops generating the internal clock signal CLK_IN during a low-level period of the clock masking signal MASK, that is, during a period where the delayed clock masking signal MASK_DLY is activated.

In this embodiment, the comparator 122 constitutes an internal reset generating circuit for generating the internal reset signal RST_IN, and the clock masking circuit 129 constitutes an internal clock generating circuit for generating the internal clock signal CLK_IN. The counter 121, the comparators 123 and 124, the inverter 126, and the OR gate 127 constitute a timing control circuit for generating the clock masking signal MASK.

As described above, since the reference value B[i:0] of the comparator 122 is higher than the reference value A[i:0] and lower than the reference value C[i:0] of the comparator 124, the internal reset signal RST_IN is inactivated within an active period of the delayed clock masking signal MASK_DLY. That is, when the output value CNT[i:0] of the counter 121 reaches the reference value A[i:0] of the comparator 123, the delayed clock masking signal MASK_DLY is activated. This enables the generation of the internal clock signal CLK_IN to be stopped. Afterward, when the output CNT[i:0] of the counter 121 reaches the reference value B[i:0] of the comparator 122, the internal reset signal RST_IN is inactivated. When the output value CNT[i:0] of the counter 121 reaches the reference value C[i:0] of the comparator 124, the delayed clock masking signal MASK_DLY is inactivated. The clock masking circuit 129 resumes generating the internal clock signal CLK_IN in response to an inactive state of the delayed clock masking signal MASK_DLY. As a result, it is possible to prevent an inactive point of time of the internal reset signal RST_IN from coinciding with an active edge, i.e., a rising edge, of the internal clock signal CLK_IN.

In this embodiment, preferably, the internal reset signal RST_IN is inactivated at the middle of an active period of the delayed clock masking signal MASK_DLY.

Figure 5A:
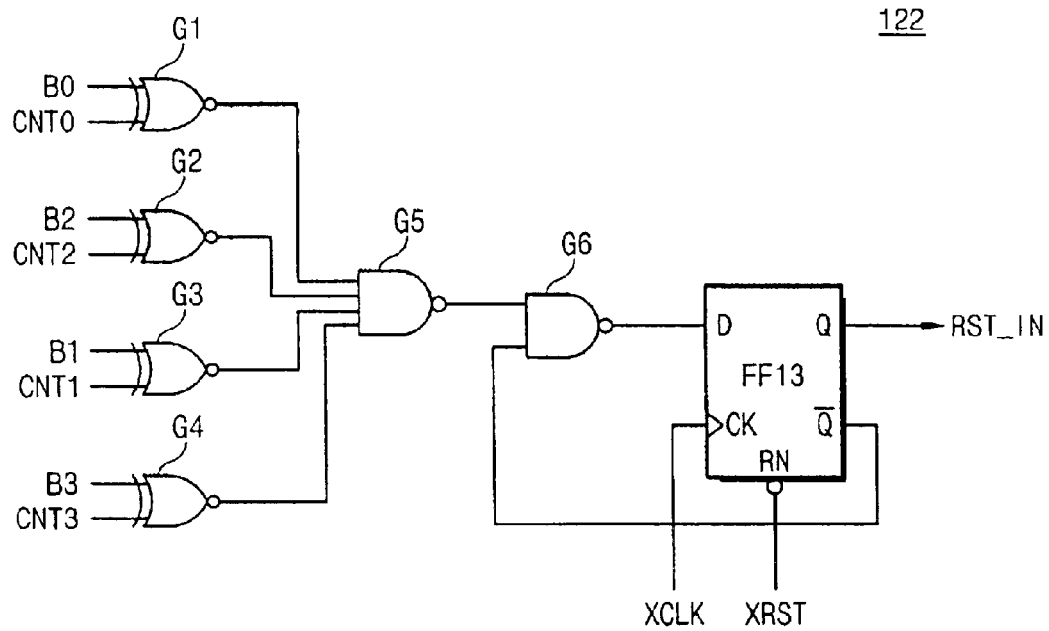
FIGS. 5A to 5C are circuit diagrams showing comparators in FIG. 4 in accordance with preferred embodiments of the present invention.

FIG. 5A is a detailed block diagram of comparator 122 shown in FIG. 4. Referring to FIG. 5A, a comparator 122 comprises four exclusive NOR gates (hereinafter, referred to as XNOR gates) G1, G2, G3 and G4, two NAND gates G5 and G6, and one flip-flop FF13. Each of the XNOR gates G1–G4 receives a corresponding bit signal of a reference value B[i:0] and a corresponding bit signal of an output value CNT[i:0] from the counter 121. For example, the XNOR gate G1 receives a bit signal B0 of the reference value B[3:0] and a bit signal CNT0 of the output value CNT[3:0] from the counter 121; the XNOR gate G2 receives a bit signal B2 of the reference value B[3:0] and a bit signal CNT2 of the output value CNT[3:0] from the counter 121; the XNOR gate G3 receives a bit signal B1 of the reference value B[3:0] and a bit signal CNT1 of the output value CNT[3:0] from the counter 121; and the XNOR gate G4 receives a bit signal B3 of the reference value B[3:0] and a bit signal CNT3 of the output value CNT[3:0] from the counter 121. Outputs of the XNOR gates G1–G4 are applied to the NAND gate G5. An output/Q of the flip-flop FF13 and an output of the NAND gate G5 are applied to the NAND gate G6. The flip-flop FF13 has its data input terminal D connected to an output of the NAND gate G6, its clock terminal CK connected to receive an external clock signal XCLK, and its reset terminal RN connected to receive an external reset signal XRST.

Operation of the comparator 122 will be described hereinafter. An output of the flip-flop FF13, that is, the internal reset signal RST_IN, is initialized to a logic low level based on activation, i.e., a high-to-low transition of an external reset signal XRST. At this time, since at least one of the input signals to the XNOR gates G1–G4 is different from remaining input signals, one of the input signals to the NAND gate G5 goes to a logic low level. This makes an output of the NAND gate G5 becomes high. Since the internal reset signal RST_IN is at a logic low level, one input signal of the NAND gate G6 goes to a logic high level. At this time, since all input signals of the NAND gate G6 are high, its output goes to a logic low level. Accordingly, the flip-flop FF13 continues to latch a logic low level in synchronization with a rising edge of the external clock signal XCLK until input signals of each XNOR gate have the same value. That is, until input signals of each XNOR gate have the same value, the internal reset signal RST_IN continues to retain a logic low level.

The comparator 122 illustrated in FIG. 5A is configured under the assumption that an output value from a counter 121 is 4-bit data. But, it will be understood that when an output value of the counter 121 is changed, the number of XNOR gates is also changed.

Figure 5B:
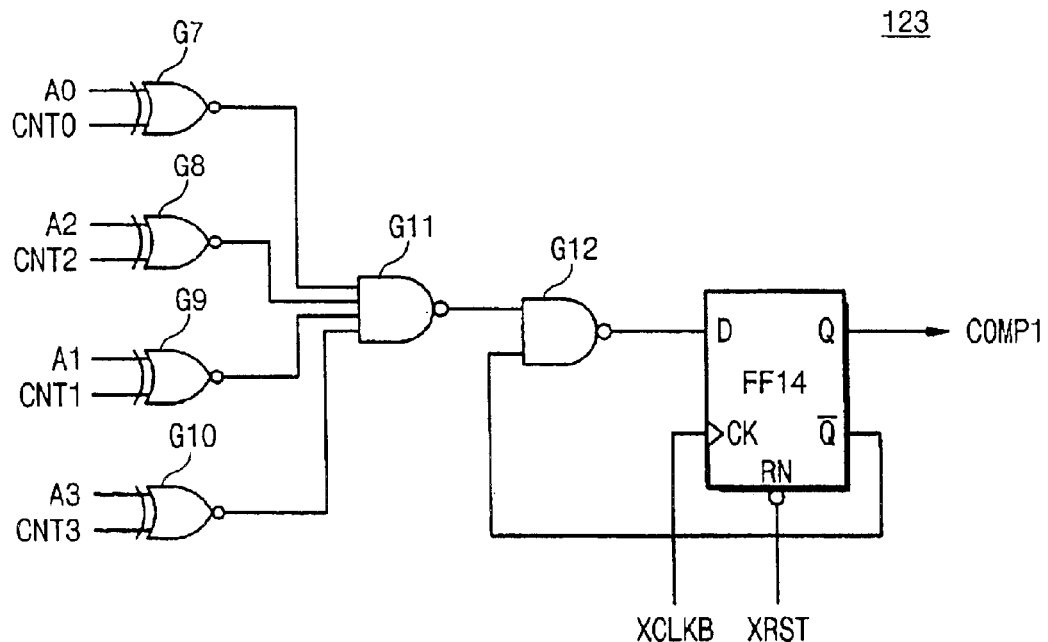
Figure 5C:
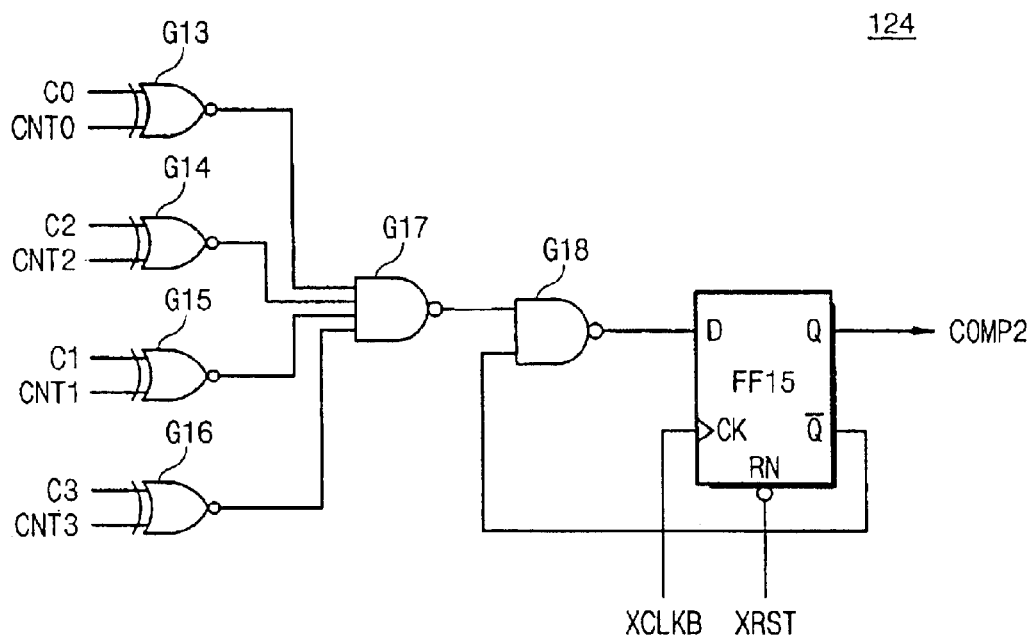

FIG. 5B is a block diagram of a comparator 123 in FIG. 4, and FIG. 5C is a block diagram of a comparator 124 in FIG. 4. As illustrated in FIGS. 5B and 5C, the construction of comparators 123 and 124 is the same as that of the comparator 22 in FIG. 5A. The comparators 123 and 124 illustrated in FIGS. 5B and 5C are identical with that in FIG. 5A except that an inverted clock signal XCLKB is applied to a clock terminal CK of each flip-flop instead of an external clock signal XCLK. Accordingly, description thereof will not be repeated.

Figure 6:
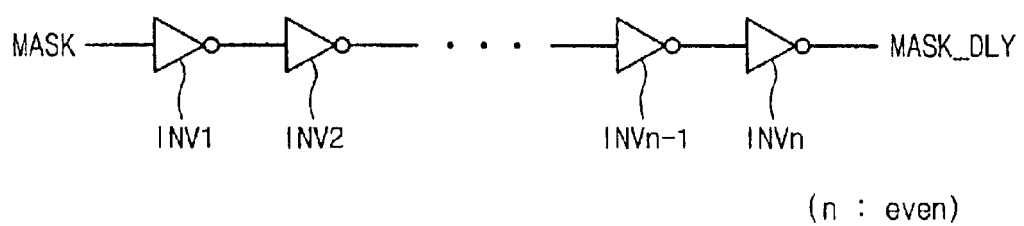
FIG. 6 is a circuit diagram showing a delay circuit in FIG. 4 in accordance with a preferred embodiment of the present invention.

FIG. 6 is a circuit diagram showing a delay circuit 128 in FIG. 4. Referring to FIG. 6, a delay circuit 128 of the present invention delays a clock masking signal MASK to generate a delayed clock masking signal MASK_DLY. The delay circuit 128 is formed of an inverter chain including of a plurality of inverters INV1–INVn. Here, the number of inverters INV1–INVn is even so that the delayed clock masking signal MASK_DLY has the same phase as the clock masking signal MASK.

Figure 7:
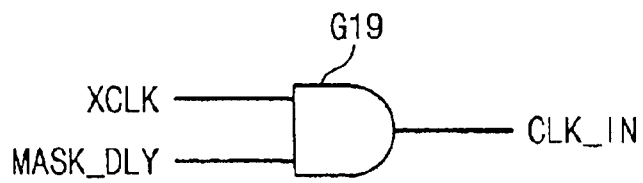
FIG. 7 is a circuit diagram showing a clock masking circuit in FIG. 4 in accordance with a preferred embodiment of the present invention.

FIG. 7 is a circuit diagram showing a clock masking circuit 129 in FIG. 4. A clock masking circuit 129 according to the present invention includes an AND gate G19, which outputs an internal clock signal CLK_IN in response to an external clock signal XCLK and the delayed clock masking signal MASK_DLY. When the delayed clock masking signal MASK_DLY is at a logic high level, the AND gate G19 outputs the external clock signal XCLK as the internal clock signal CLK_IN. When the delayed clock masking signal MASK_DLY is at a logic low level, the AND gate G19 masks the external clock signal XCLK.

Figure 8:
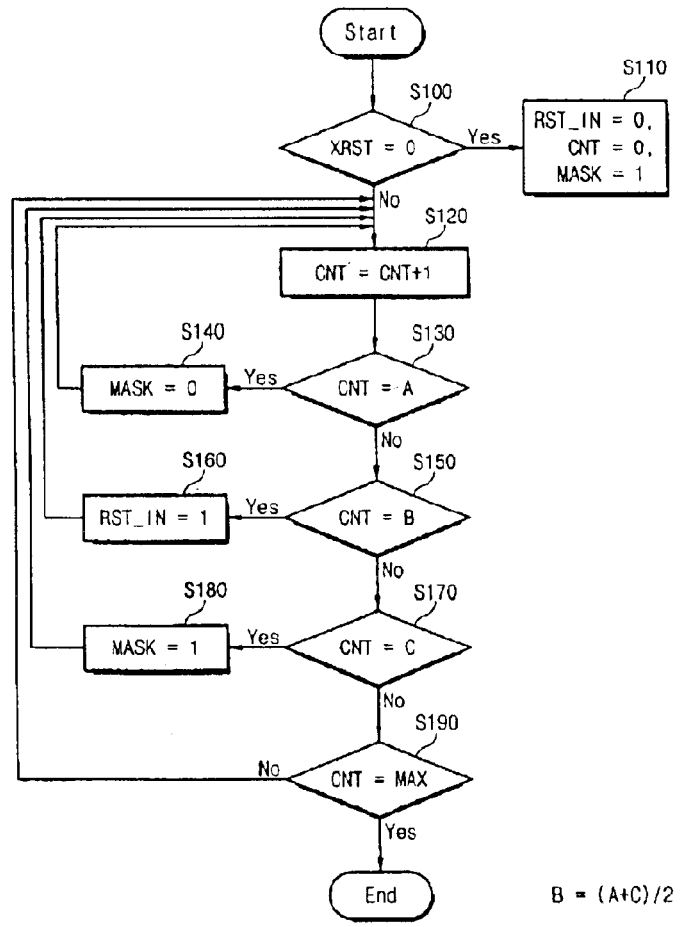
FIG. 8 is a flowchart illustrating operation of a reset and clock regenerator circuit of a semiconductor device according to the present invention.

FIG. 8 is a flowchart illustrating the operation of a reset and clock regenerator circuit of a semiconductor device according to the present invention. A reset and clock regenerator circuit 120 of the present invention determines whether an external reset signal XRST becomes low (block S100). If the external reset signal XRST becomes low, a counter 121 and comparators 122, 123 and 124 are initialized (block S110). At this time, an internal reset signal RST_IN goes to a logic low level, an output CNT of the counter 121 is initialized to "0", and a clock masking signal MASK goes high.

When the external reset signal XRST transitions from a logic low level to a logic high level, the counter 121 performs a counting operation in response to an external clock signal XCLK (block S120). In block S130, it is determined whether an output CNT of the counter 121 conforms to a reference value A of the comparator 123. If so, the clock masking signal MASK goes to a logic low level (block S140). If not, it is determined whether the output CNT of the counter 121 conforms to a reference value B of the comparator 122 (block S150). If so, the internal reset signal RST_IN transitions from a logic low level to a logic high level (block S160). If not, it is determined whether the output CNT of the counter 121 conforms to a reference value C of the comparator 124 (block S170). If so, the clock masking signal MASK transitions from a logic low level to a logic high level (block S180). If not, it is determined whether the output CNT of the counter 121 reaches its maximum value (block S190). If so, operation of the reset and clock regenerator circuit 120 is completed. If not, the operation returns to block S120.

Figure 9:
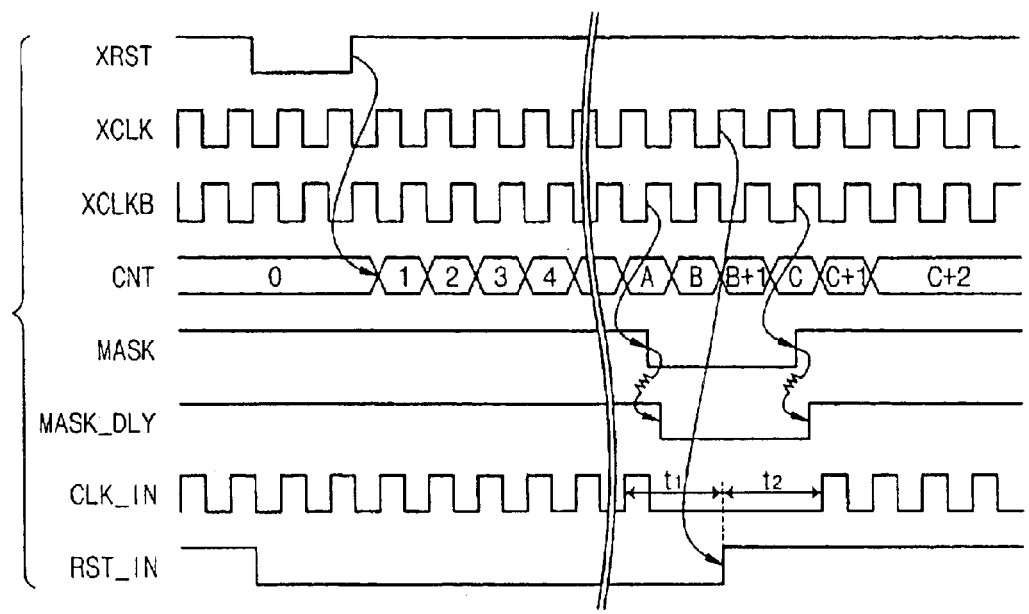
FIG. 9 is a timing diagram illustrating operation of a reset and clock regenerator circuit of a semiconductor device according to the present invention.

FIG. 9 is a timing diagram illustrating operation of a reset and clock regenerator circuit of a semiconductor device according to the present invention. Referring to FIG. 9, when an external reset signal XRST has a high-to-low transition, that is, when the external reset signal XRST is activated, comparators 122, 123 and 124 are reset. At this time, an internal reset signal RST_IN has a high-to-low transition, and output signals COMP 1 and COMP2 of comparators 123 and 124 are reset to a logic low level. With this condition, as illustrated in FIG. 9, the clock masking signal MASK has a logic high level. When the clock masking signal MASK is at a logic high level, the clock masking circuit 129 generates the internal clock signal CLK_IN in response to the external clock signal XCLK.

When the external reset signal XRST transitions from a logic low level to a logic high level, that is, when it is inactivated, the counter 121 performs its counting operation in synchronization with the external clock signal XCLK. When an output value CNT[i:0] of the counter 121 reaches a reference value A[i:0] of the comparator 123, the output signal COMP1 of the comparator 123 has a low-to-high transition in synchronization with a rising edge of the clock signal XCLKB while the output signal COMP2 of the comparator 124 retains an initial state, i.e., a logic low level. In accordance with this condition, the clock masking signal MASK from OR gate 127 has a high-to-low transition. This signal is delayed by a quarter of a period of the external clock signal XCLK. The clock masking circuit 129 stops generating the internal clock signal CLK_IN when a delayed signal MASK_DLY transitions from a logic high level to a logic low level. That is, when the delayed signal MASK_DLY is activated low, the external clock signal XCLK is not outputted as the internal clock signal CLK_IN.

After the output value CNT[i:0] of the counter 121 reaches the reference value A[i:0] of the comparator 123 and after a certain amount of time elapses, as illustrated in FIG. 9, the output value CNT[i:0] of the counter 121 reaches the reference value B[i:0] of the comparator 122. The internal reset signal RST_IN from the comparator 122 is inactivated at a clock cycle which follows a clock cycle where the output value CNT[i:0] of the counter 121 reaches the reference value B[i:0] of the comparator 122. When the counter 121 continues to perform its counting operation and then its output value CNT[i:0] reaches the reference value C[i:0] of the comparator 124, the output signal COMP2 of the comparator 124 transitions from a logic low level to a logic high level in synchronization with a low-to-high transition of the clock signal XCLKB.

As the output signal COMP2 of the comparator 124 transitions to a logic high level, the clock masking signal MASK from the OR gate 127 goes to a logic high level. This signal is delayed by a quarter of a period of the clock signal XCLK through the delay circuit 127. The clock masking circuit 129 resumes generating the internal clock signal CLK_IN in response to the delayed signal MASK_DLY. That is, the external clock signal XCLK is outputted as the internal clock signal CLK_IN.

As illustrated in FIG. 9, after the external clock signal XRST is inactivated, timing margin of t1 and t2 is secured between an inactive point of time of the internal reset signal RST_IN and an active edge of the internal clock signal CLK_IN. The time t1 is sufficiently more than a removal time $t_{RM}$ of the internal reset signal RST_IN, and the time t2 is sufficiently more than a recovery time $t_{RC}$ of the internal reset signal RST_IN. Accordingly, the timing limitations of the internal clock and reset signals CLK_IN and RST_IN from the regenerator circuit 120 are met. Although a period of the external clock signal XCLK becomes shorter, such timing limitations can be prevented by adjusting the reference values A[i:0], B[i:0] and C[i:0] of comparators 122, 123 and 124, respectively.

Figure 10:
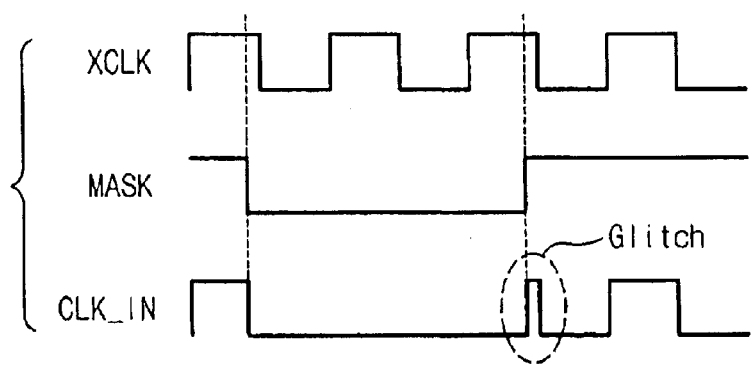
FIG. 10 is a timing diagram illustrating an inadvertent pulse or glitch in an internal clock signal when a delay circuit in FIG. 4 is not used.

As described above, the clock masking signal MASK is delayed by a quarter of a period of the external clock signal XCLK through the delay circuit 128. The reason is because an inadvertent pulse or "glitch" arises on the internal clock signal CLK_IN when masking the external clock signal XCLK without a delay, as illustrated in FIG. 10. Flip-flops in a semiconductor device recognize this glitch as an internal clock signal, thus causing various timing problems.

Figure 11:
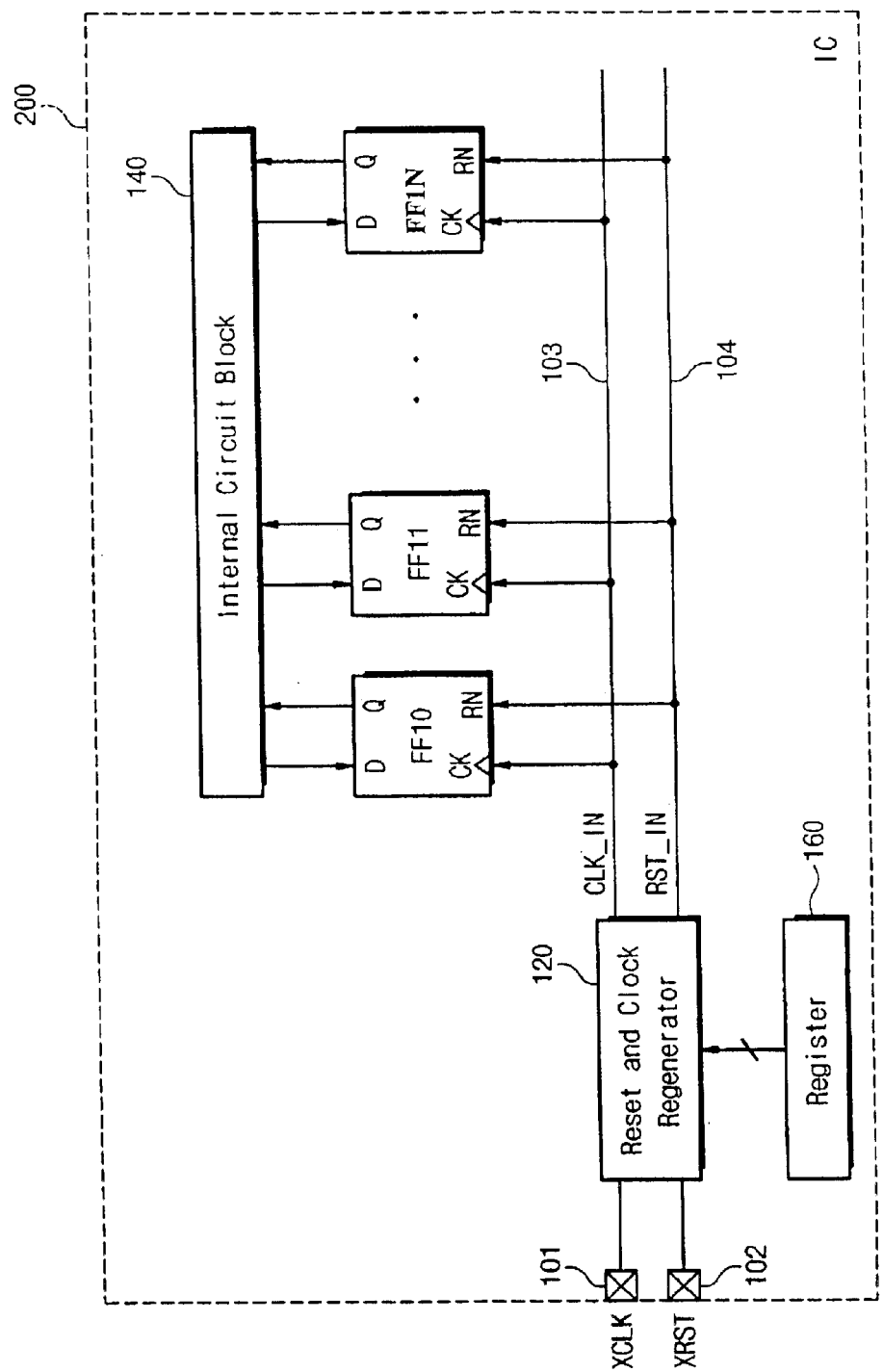
FIG. 11 is a block diagram showing a semiconductor device according to another embodiment of the present invention.

The reference values B[i:0], A[i:0] and C[i:0] can be provided to the comparators 122, 123 and 124, respectively, by various means, for example, as illustrated in FIG. 4. Referring to FIG. 11, which shows a semiconductor device according to another embodiment of the present invention, a register 160 for storing reference values A[i:0], B[i:0] and C[i:0] is further provided in a semiconductor device 200. A reset and clock regenerator circuit 120 in FIG. 11 is identical to that shown in FIG. 3, and description thereof will not be repeated. The register 160 can store all reference values. Alternatively, one of the reference values can be stored in the register 160. In this case, remaining reference values can be generated using the stored reference value.

Figure 12:
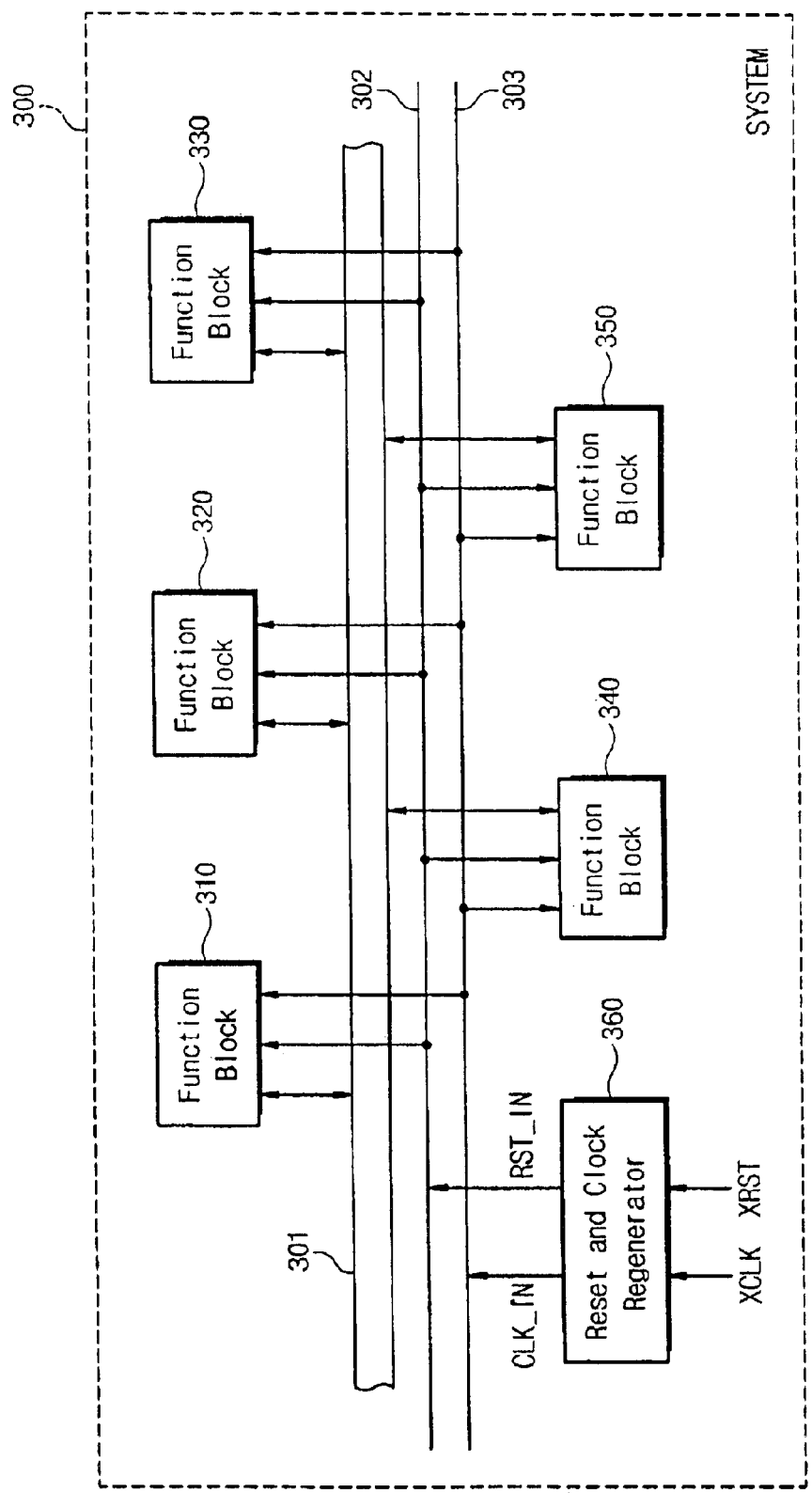
FIG. 12 is a block diagram showing a semiconductor device according to another embodiment of the present invention.

FIG. 12 is a block diagram showing a high-speed digital system using a reset and clock regenerating approach according to the present invention. Referring to FIG. 12, a high-speed digital system 300 according to the present invention comprises a plurality of function blocks 310, 320, 330, 340 and 350 connected to a data bus 301, a reset and clock regenerator circuit 360, a signal line 302 for transmitting an internal reset signal RST_IN from the regenerator circuit 360, and a signal line 303 for transmitting an internal clock signal CLK_IN from the regenerator circuit 360. Although not shown in the figure, a plurality of memory elements such as flip-flops are incorporated in each of the function blocks 310–350. The internal reset signal RST_IN and the internal clock signal CLK_IN may be supplied to a memory element of each function block.

The reset and clock regenerator circuit 360 is identical with that in FIG. 4, and description thereof will not be repeated.

In this embodiment, a reset and clock regenerator circuit incorporating a register for storing reference values can be used. Alternatively, as illustrated in FIG. 11, a register can be arranged at the outside of the reset and clock regenerator circuit.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for regenerating reset and clock signals, comprising:
   a clock circuit for receiving an external clock signal and generating therefrom an internal clock signal, the internal clock signal being forwarded to a plurality of clocked circuits to clock the clocked circuits;
   a reset circuit for receiving an external reset signal and generating therefrom an internal reset signal, the internal reset signal being forwarded to the plurality of clocked circuits to reset the clocked circuits; and
   a clock masking circuit for masking the internal clock signal for a masking period such that the clocked circuits are not clocked during the masking period.

2. The apparatus of claim 1, wherein the reset circuit generates the internal reset signal in a transition to an inactive state during the masking period.

3. The apparatus of claim 2, wherein the internal reset signal transitions to an inactive state at a substantial midpoint of the masking period.

4. The apparatus of claim 1, wherein the clock circuit comprises a counter circuit for generating a count of a number of cycles of the external clock signal.

5. The apparatus of claim 4, wherein the clock circuit comprises a first comparator circuit for comparing the count with a first threshold and initiating the masking period when the count reaches the first threshold.

6. The apparatus of claim 5, wherein the clock circuit comprises a second comparator circuit for comparing the count with a second threshold and terminating the masking period when the count reaches the second threshold.

7. The apparatus of claim 6, wherein the clock circuit comprises a third comparator circuit for comparing the count with a third threshold and transitioning the internal reset signal to an inactive state when the count reaches the third threshold.

8. The apparatus of claim 7, wherein the third threshold is between the first and second thresholds.

9. The apparatus of claim 7, wherein the third threshold is substantially midway between the first and second thresholds.

10. The apparatus of claim 7, wherein the first, second and third thresholds are selected such that, in all of the clocked circuits, ambiguity with respect to timing of clocking and resetting the clocked circuits is eliminated.

11. The apparatus of claim 1, wherein the clock circuit comprises a mask delay circuit for delaying the masking period until after an active-to-inactive transition of the internal clock signal.

12. The apparatus of claim 1, wherein the clock circuit comprises a mask delay circuit for delaying the masking period until after a predicted external clock signal routing delay.

13. The apparatus of claim 1, wherein the clocked circuits are flip-flops.

14. The apparatus of claim 1, wherein the clocked circuits are D flip-flops.

15. The apparatus of claim 1, wherein the masking circuit generates a mask signal used in initiating and terminating the masking period.

16. A method for regenerating reset and clock signals, comprising:
receiving an external reset signal;
receiving an external clock signal;
generating from the external reset signal an internal reset signal, the internal reset signal being forwarded to the plurality of clocked circuits to reset the clocked circuits; generating from the external clock signal an internal clock signal, the internal clock signal being forwarded to a plurality of clocked circuits to clock the clocked circuits; and
masking the internal clock signal for a masking period such that the clocked circuits are not clocked during the masking period.

17. The method of claim 16, further comprising generating the internal reset signal in a transition to an inactive state during the masking period.

18. The method of claim 17, wherein the internal reset signal transitions to an inactive state at a substantial midpoint of the masking period.

19. The method of claim 16, wherein generating the internal clock signal comprises generating a count of a number of cycles of the external clock signal.

20. The method of claim 19, wherein generating the internal clock signal comprises comparing the count with a first threshold and initiating the masking period when the count reaches the first threshold.

21. The method of claim 20, wherein generating the internal clock signal comprises comparing the count with a second threshold and terminating the masking period when the count reaches the second threshold.

22. The method of claim 21, wherein generating the internal reset signal comprises comparing the count with a third threshold and transitioning the internal reset signal to an inactive state when the count reaches the third threshold.

23. The method of claim 22, wherein the third threshold is between the first and second thresholds.

24. The method of claim 22, wherein the third threshold is substantially midway between the first and second thresholds.

25. The method of claim 22, wherein the first, second and third thresholds are selected such that, in all of the clocked circuits, ambiguity with respect to timing of clocking and resetting the clocked circuits is eliminated.

26. The method of claim 16, wherein generating the internal clock signal comprises delaying the masking period until after an active-to-inactive transition of the internal clock signal.

27. The method of claim 16, wherein generating the internal clock signal comprises delaying the masking period until after a predicted external clock signal routing delay.

28. The method of claim 16, wherein the clocked circuits are flip-flops.

29. The method of claim 16, wherein the clocked circuits are D flip-flops.

30. The method of claim 16, wherein masking the internal clock signal comprises generating a mask signal used in initiating and terminating the masking period.

31. A high-speed digital system, comprising:
a plurality of function blocks;
a bus to which the function blocks are coupled; and
a reset signal and clock signal regenerating circuit comprising:
a clock circuit for receiving an external clock signal and generating therefrom an internal clock signal, the internal clock signal being forwarded to a plurality of clocked circuits to clock the clocked circuits,
a reset circuit for receiving an external reset signal and generating therefrom an internal reset signal, the internal reset signal being forwarded to the plurality of clocked circuits to reset the clocked circuits, and
a clock masking circuit for masking the internal clock signal for a masking period such that the clocked circuits are not clocked during the masking period.

32. The system of claim 31, wherein the reset circuit generates the internal reset signal in a transition to an inactive state during the masking period.

33. The system of claim 32, wherein the internal reset signal transitions to an inactive state at a substantial midpoint of the masking period.

34. The system of claim 31, wherein the clock circuit comprises a counter circuit for generating a count of a number of cycles of the external clock signal.

35. The system of claim 34, wherein the clock circuit comprises a first comparator circuit for comparing the count with a first threshold and initiating the masking period when the count reaches the first threshold.

36. The system of claim 35, wherein the clock circuit comprises a second comparator circuit for comparing the count with a second threshold and terminating the masking period when the count reaches the second threshold.

37. The system of claim 36, wherein the reset circuit comprises a third comparator circuit for comparing the count with a third threshold and transitioning the internal reset signal to an inactive state when the count reaches the third threshold.

38. The system of claim 37, wherein the third threshold is between the first and second thresholds.

39. The system of claim 37, wherein the third threshold is substantially midway between the first and second thresholds.

40. The system of claim 37, wherein the first, second and third thresholds are selected such that, in all of the clocked circuits, ambiguity with respect to timing of clocking and resetting the clocked circuits is eliminated.

41. The system of claim 31, wherein the clock circuit comprises a mask delay circuit for delaying the masking period until after an active-to-inactive transition of the internal clock signal.

42. The system of claim 31, wherein the clock circuit comprises a mask delay circuit for delaying the masking period until after a predicted external clock signal routing delay.

43. The system of claim 41, wherein the clocked circuits are flip-flops.

44. The system of claim 41, wherein the clocked circuits are D flip-flops.

45. The system of claim 41, wherein the masking circuit generates a mask signal used in initiating and terminating the masking period.

* * * * *

UNITED STATES PATENT AND TRADEMARK OFFICE
CERTIFICATE OF CORRECTION

PATENT NO. : 6,864,735 B2
DATED : March 8, 2005
INVENTOR(S) : Jin-tea Joo

It is certified that error appears in the above-identified patent and that said Letters Patent is hereby corrected as shown below:

Column 11,
Line 12, please delete "clock" and insert -- reset --.

Signed and Sealed this

Fourteenth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,864,735 B2
DATED : March 8, 2005
INVENTOR(S) : Jin-tae Joo

It is certified that error appears in the above-identified patent and that said Letters Patent is hereby corrected as shown below:

Column 11,
Line 12, please delete "clock" and insert -- reset --.

This certificate supersedes Certificate of Correction issued June 14, 2005.

Signed and Sealed this

Twenty-third Day of August, 2005

JON W. DUDAS
*Director of the United States Patent and Trademark Office*